(12) United States Patent
Maurer

(10) Patent No.: US 6,665,448 B1
(45) Date of Patent: Dec. 16, 2003

(54) SELECTIVE SMOOTHING AND SHARPENING OF IMAGES BY GENERALIZED UNSHARP MASKING

(75) Inventor: Ron P. Maurer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 526 days.

(21) Appl. No.: 09/676,201

(22) Filed: Sep. 29, 2000

(51) Int. Cl.⁷ .................................................. G06T 5/50
(52) U.S. Cl. ........................................................ 382/261
(58) Field of Search ................................. 382/261, 263, 382/264

(56) References Cited

U.S. PATENT DOCUMENTS

| | | | |
|---|---|---|---|
| 4,315,318 A | | 2/1982 | Kato et al. .................. 364/515 |
| 5,220,624 A | * | 6/1993 | Sakamoto et al. .......... 382/266 |
| 5,402,338 A | * | 3/1995 | Ito .............................. 600/407 |
| 6,055,340 A | * | 4/2000 | Nagao ......................... 382/261 |
| 6,169,823 B1 | * | 1/2001 | Takeo et al. ................. 382/308 |

OTHER PUBLICATIONS

Andrea Polesel et al; "Image Enhancement via Adaptive Unsharp Masking"; IEEE Transactions on Image Processing, vol. 9, No. 3, Mar. 2000 pp. 505–510.

Mahmoodi, A B et al; "An Adaptive Edge and Contrast Enhancement Technique based on Unsharp Masking" Proceedings on the SPIE, SPIE, Bellingham, VA US vol 454, 1984 pp. 326–330.

\* cited by examiner

*Primary Examiner*—Leo Boudreau
*Assistant Examiner*—Patrick L. Edwards

(57) ABSTRACT

A method of deriving from an existing selective image smoothing filter either a corresponding filter for selective image sharpening, or a corresponding filter for both selective smoothing and selective image sharpening. The selective sharpening filter can be implemented quickly by using implementations of the existing selective smoothing filter and a derived matching non-selective smoothing filter as black boxes and combining their outputs in a simple manner. Alternatively, the derived selective sharpening filter can be implemented by inlining the combination of the implementations of the existing selective smoothing.

4 Claims, 4 Drawing Sheets

| $P_1$ | $P_2$ | $P_3$ |
|---|---|---|
| $P_4$ | $P_0$ | $P_5$ |
| $P_6$ | $P_7$ | $P_8$ |

FIGURE 3B

SELECTIVE SMOOTHING AND SHARPENING OF IMAGES BY GENERALIZED UNSHARP MASKING

FIELD OF THE INVENTION

The present invention relates to processing of image data and in particular to the enhancement of images by sharpening and smoothing filtering.

BACKGROUND OF THE INVENTION

In many image-processing applications it is desirable to apply both smoothing and sharpening to image data in order to improve their appearance. In the linear-filtering domain, smoothing is done by attenuating high-frequency components of the image (low-pass filtering). Alternatively, sharpening is done by amplifying high-frequency components, also known as Unsharp Masking (USM), which is expressed mathematically as:

$$y=x+\lambda(H^*x), (H=I-L) \quad \text{(Eq. 1)}$$

where x is the input image signal, y is the output image signal, $\lambda$ is a real constant termed "the sharpness gain", and H is a linear high-pass filter. The linear high-pass filter H can also be expressed as the difference between an identity-filter I and a linear low-pass filter L. The main advantage of linear filters for denoising or sharpening is their simplicity and efficiency. Unfortunately, sharpening and denoising undo each other's operation, so that achieving both effective denoising and effective sharpening is not possible with linear-filters. This remains true even when the denoising and sharpening are performed in separate steps.

Many selective denoising techniques have been investigated, which effectively attenuate selected types of noise without smoothing edges. These techniques do not utilize the selectiveness of the denoising filter to enhance edges and instead just leaved them un-smoothed. In a similar manner, many selective sharpening methods are known which effectively enhance edges without attenuating small amplitude noise in flat regions. These techniques do not utilize the selectiveness of the sharpening filter to denoise non-edge regions and instead just leave them unsharpened.

There are also many image-enhancement techniques that are known, which perform both denoising and sharpening. Most are based on a hard classification of neighborhoods corresponding to "non-features" (e.g., background, noise), and "features" (edges). Then a denoising algorithm is applied to "non-feature" neighborhoods and an unrelated sharpening algorithm is applied to "feature" neighborhoods. One limitation of such an approach is its relatively high computational complexity. Specifically, there are two separate operations that are performed at each pixel: a block/neighborhood classification and either a smoothing or a sharpening operation. Another limitation of the "hard" classification approach is the possibility of artifacts due to misclassifications, especially in noisy images.

This drawback can be eliminated, in part, by performing another technique in which both a smoothing operation and an unrelated sharpening operation is performed on each pixel and then the results of the smoothing and sharpening operations are mixed using a soft-decision function. However, this technique increases the computational complexity of the image enhancement process even more, since now both the smoothing algorithm and the unrelated sharpening algorithm needs to be applied at each pixel.

A simpler method for combining smoothing and sharpening is based on linear unsharp masking, (Eq. 1) by modifying the local "sharpness gain factor" $\lambda(i,j)$ such that it has positive values (sharpening) in activity regions but negative values (smoothing) in flat regions. The local sharpness gain factor $\lambda(i,j)$ is in fact a soft-decision factor corresponding to a measure of the desired feature (activity). The computational complexity of this method is still relatively high since at each pixel both the high-pass filter response $(H^*x)$ and the activity measure $\lambda(i,j)$ must be determined. Also, neither the linear high-pass filter nor the activity measure differentiate between dither patterns and directional edges. It is hard to extend this method to handle different activity patterns in different ways, since both the high-pass filter and the activity measure must be redesigned.

Hence, what is needed is a simple manner in which to design efficient selective image sharpening or selective image sharpening and selective image smoothing filters.

SUMMARY OF THE INVENTION

A method of designing an image processing filter in which a pre-existing selective smoothing filter is used to derive a matching non-selective smoothing filter by disabling the selectivity mechanism of the selective smoothing filter and then the difference of the pre-existing and derived filters is substituted into the high-pass filter operation of an unsharp masking filter operation to form the image processing filter.

BRIEF DESCRIPTION OF THE DRAWINGS

The objects, features, and advantages of the present invention will be apparent to one skilled in the art, in view of the following detailed description in which:

FIG. 3B illustrates an exemplary 3×3 neighborhood.

DETAILED DESCRIPTION OF THE INVENTION

A generalized method of designing selective filters given a selective smoothing filter $\hat{I}$ is described and a method therein of applying the selective filter to image data.

Figure 1:
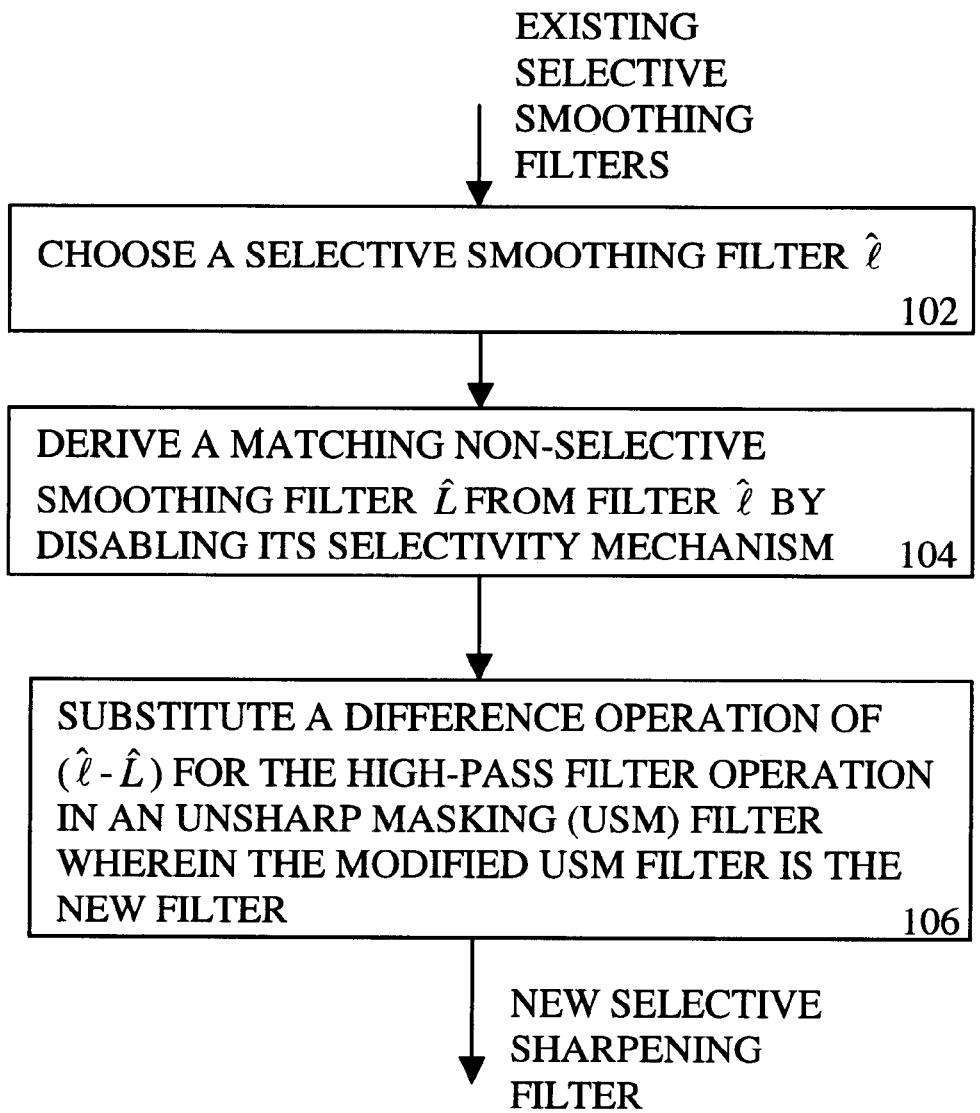
FIG. 1 illustrates an embodiment of a generalized method of designing a filter for selective sharpening of image data.

FIG. 1 shows a first embodiment of a method of designing a filter which performs selective sharpening of image data. The selective sharpening filter is designed from a pre-existing selective smoothing filter $\hat{I}$. In general, a selective smoothing filter is defined as a filter that operates on selected "non-feature" pixel values in an image and replaces them with a weighted average of its neighbors. This attenuates high frequency components, namely abrupt changes, in pixel intensity. The selectiveness of the selective smoothing filter $\hat{I}$ is based on a classification of neighborhoods which range from "feature" type neighborhoods (also referred to as $\phi$-type neighborhoods) which generally correspond to edges and "non-feature" type neighborhoods (also referred to as $\alpha$-type neighborhoods). The selective smoothing filter $\hat{I}$ fully attenuates "non-feature" pixels having $\alpha$-type neighborhoods, does not attenuate "feature" pixels having $\phi$-type neighborhoods, and attenuates to some degree pixels that are classified between "feature" or "non-feature". In general, selective smoothing filters include a selectivity mechanism which is dependent on the classification of the "feature" and "non-feature" types. The selectivity mechanism can be based on differences in photometric distance between pixels (i.e., intensity differences) and/or geometric distance between pixels or on other criteria used for classifying image neighborhoods.

Given the selective smoothing filter $\hat{I}$ (block 102), it is assumed that it is always possible to derive a corresponding/matching smoothing filter $\hat{L}$ (block 104) that is non-selective by disabling the selectivity mechanism of $\hat{I}$. The non-selective smoothing filter $\hat{L}$ is derived in such a manner such that in "non-feature" neighborhoods (type $\alpha$), it has exactly the same effect as $\hat{I}$. On the other hand, in "feature" neighborhoods (type $\phi$) non-selective filter $\hat{L}$ has a smoothing effect while selective filter $\hat{I}$ does not.

One example, of how to derive a matching non-selective smoothing filter from a pre-existing selective smoothing filter by disabling the selectivity mechanism of the selective filter is described with respect to a robust anisotropic diffusion (RAD) filter. A given RAD filter is applied to a 3×3 neighborhood about a pixel of interest $P_0$ to perform an operation as defined by Eq. 2 on each pixel in the image:

$$P'_0 = P_0 + (\Delta t) \sum_{j=1}^{8} C_j \psi(P_j - P_0, T) \quad \text{(Eq. 2)}$$

where $\psi$ is the influence-function of the robust error-norm, T is the characteristic scale of $\psi$, $P_0$ and $P_j$ are pixel values in a 3×3 neighborhood as shown in FIG. 3B, and $C_j$ is the spatial weight which can be interpreted either as spatial filter coefficients, or as stochastic probabilities of random-walk transitions from pixel $P_j$ to pixel $P_0$ in the 3×3 neighborhood. In this example, $\Delta t=1$. The influence function $\psi$ corresponds to a photometric weighting function which determines the selectivity of the RAD filter function. In this example the influence function is defined by the following conditions:

$$\psi(\Delta P, T) = \begin{cases} \Delta P \geq T & T \\ |\Delta P| < T & \Delta P \\ \Delta P \leq -T & -T \end{cases}$$

wherein $\Delta P$ is $P_j - P_0$. The influence function and hence, the selectivity of the filter, is dependent on whether the photometric difference ($\Delta P$) is greater than, less than, or equal to parameter T. Consequently, to disable the selectivity of the RAD filter, the parameter T can be set to o so that the influence function is the same no matter what the photometric difference is.

Next, a difference operation of the selective smoothing filter $\hat{I}$ and the derived matching non-selective smoothing filter $\hat{L}$ is substituted for the high-pass filter operation performed on the input image data in an unsharp masking filter (block 106). The resulting filter is a new selective sharpening filter designed from an unsharp masking filter in which the high-pass filter operation is replaced with the difference operation of the selective smoothing filter and the derived matching non-selective smoothing filter. It should be noted that in one embodiment, the method is performed in a single iteration of processing the image data.

The following describes the substitution of the high-pass filter operation with the difference operation ($\hat{I}-\hat{L}$) in an unsharp masking filter. Analyzing the difference operation, it can be shown that the operation has a different effect on each of the neighborhood types, $\phi$ and $\alpha$. Specifically, in $\alpha$-type neighborhoods, the filtering effects of $\hat{L}$ and $\hat{I}$ are exactly the same. As a result, the difference operation is zero. In $\phi$-type neighborhoods, $\hat{I}$ has no effect and is equivalent to the identity operator $\hat{I}$, while $\hat{L}$ has a strong smoothing effect (the smoothing effect is naturally larger on "feature" pixels). Thus, in $\phi$-neighborhoods $(\hat{I}-\hat{L}) \sim (\hat{I}-\hat{L})$. In other words, $(\hat{I}-\hat{L})$ is a selective feature-enhancement filter, generating a zero output signal at "non-feature" pixels ($\alpha$), and a strong output signal at "feature" pixels $\phi$. Generally, since $\hat{L}$ is a feature-attenuation filter, then $\hat{I}-\hat{L}$ is a feature-enhancement filter. In particular, when $\hat{L}$ is a linear low-pass filter, $\hat{I}-\hat{L}$ is a linear high-pass filter. Consequently, since $(\hat{I}-\hat{L}) \sim (\hat{I}-\hat{L})$, and since $\hat{I}-\hat{L}$ is a linear high-pass filter, $(\hat{I}-\hat{L})$ can be substituted for the high-pass filter operation in the unsharp masking filter. Scaling the output of $(\hat{I}-\hat{L})$ by a real positive factor $\lambda$ and adding the result to the original image data x yields a selective unsharp masking filter having a function defined by Eq. 3:

$$y = x + \lambda \cdot (\hat{I}-\hat{L})x \quad \text{(Eq. 3)}$$

In a particular case where $\hat{L}$ is linear, and the "feature" pixels correspond to edges, the unsharp masking filter as defined by Eq. 3 is equivalent to a linear unsharp masking filter (Eq. 1) at edges, and equivalent to the identity filter in "non-edge" pixels (flat regions). In other words, noise is not enhanced in flat regions.

The advantage of this method of filter design is that pre-existing selective smoothing filters that have been developed so as to have particular filtering characteristics can be used to design new selective sharpening filters having the same filtering characteristics. For example, if a pre-existing selective smoothing filter is characterized as a filter that selectively smoothes the image data while preserving edges with well defined directionality, then the selective sharpening filter which is designed according to the method shown in FIG. 1 will sharpen only edges with well defined directionality.

Figure 2:
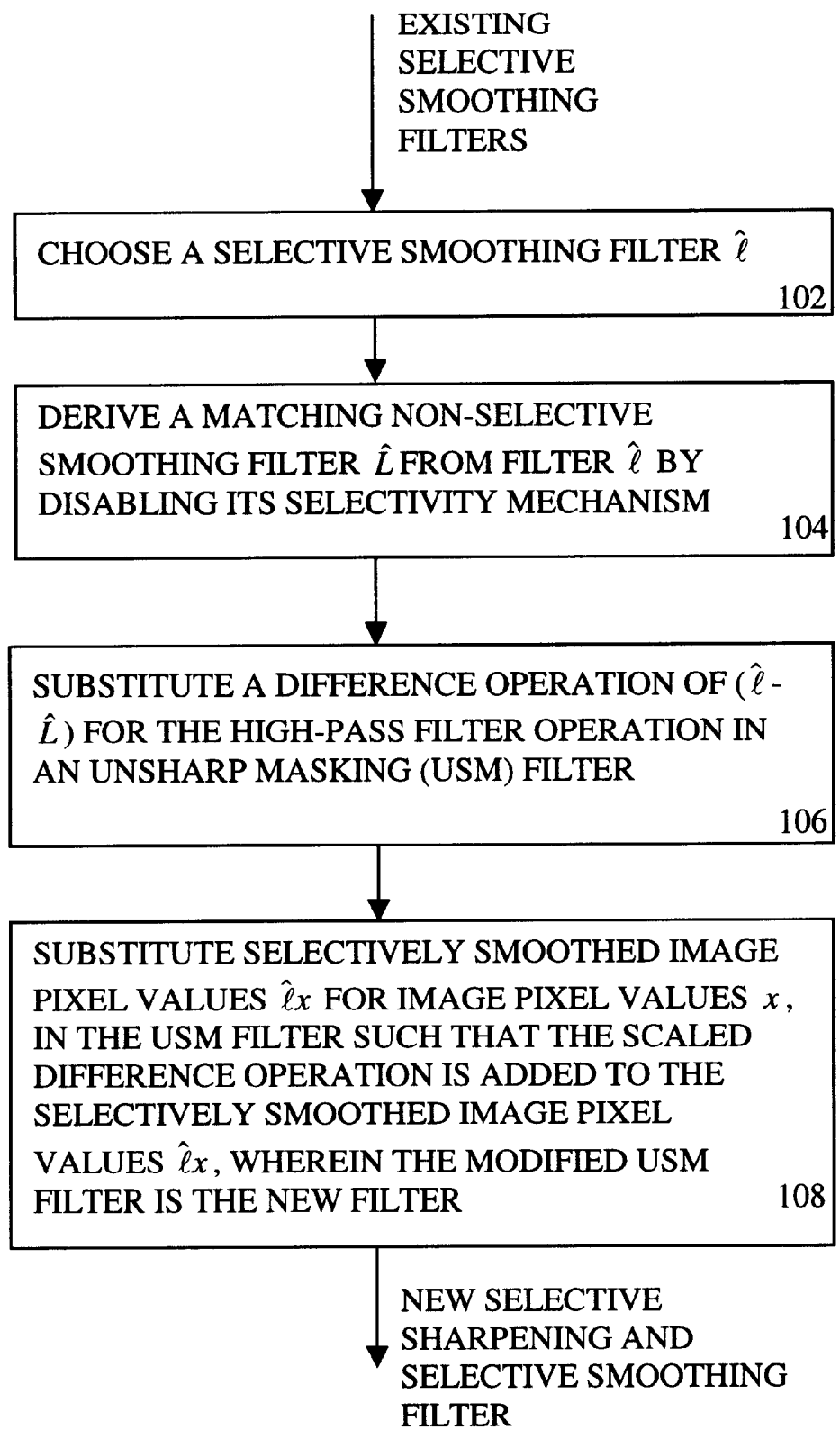
FIG. 2 illustrates an embodiment of a generalized method of designing a filter for selective sharpening and selective smoothing of image data.

FIG. 2 shows a second embodiment of the method of designing a filter that both selectively smoothes "non-feature" pixels and selectively sharpens "feature" pixels in a single pass over the image. According to this method, a selective smoothing filter $\hat{I}$ is selected (block 102), a matching non-selective smoothing filter $\hat{L}$ is derived (block 104), and the difference operation $(\hat{I}-\hat{L})$ is substituted for the high-pass filter operation in an unsharp masking filter as in the method shown in FIG. 1. Next, the selectively smoothed image pixel values $\hat{I}x$ is substituted for the image pixel values x in the unsharp masking filter such that the smoothed image pixel values $\hat{I}x$ are added to the scaled difference operation of the image data (i.e., $\lambda \cdot (\hat{I}-\hat{L})x$) instead of the input image pixel values x. This substitution within the unsharp masking filter is illustrated by Eq. 4 as follows:

$$y = \hat{I}x + \lambda \cdot (\hat{I}-\hat{L})x \quad \text{(Eq. 4)}$$

The net effect of this substitution is that the portion of the unsharp masking filter that implements the $\lambda(\hat{I}-\hat{L})x$ operation performs selective sharpening of the image data while the portion of the unsharp masking filter that implements the $\hat{I}x$ operation performs selective smoothing of the image data. Consequently, the method as shown in FIG. 2 illustrates that a selective sharpening and selective smoothing filter can be designed given a pre-existing selective smoothing filter $\hat{I}$. One advantage of the new selective smoothing and sharpening filter obtained according to this design method is that the smoothing filter portion operates on non-feature neighborhoods without affecting the feature neighborhoods and the sharpening filter portion performs a complimentary function of enhancing feature neighborhoods without affecting non-feature neighborhoods. As a result, smoothing and sharpening operations do not interfere with each other or undo each others filtering affects as is seen in prior art filtering techniques.

Figure 3A:
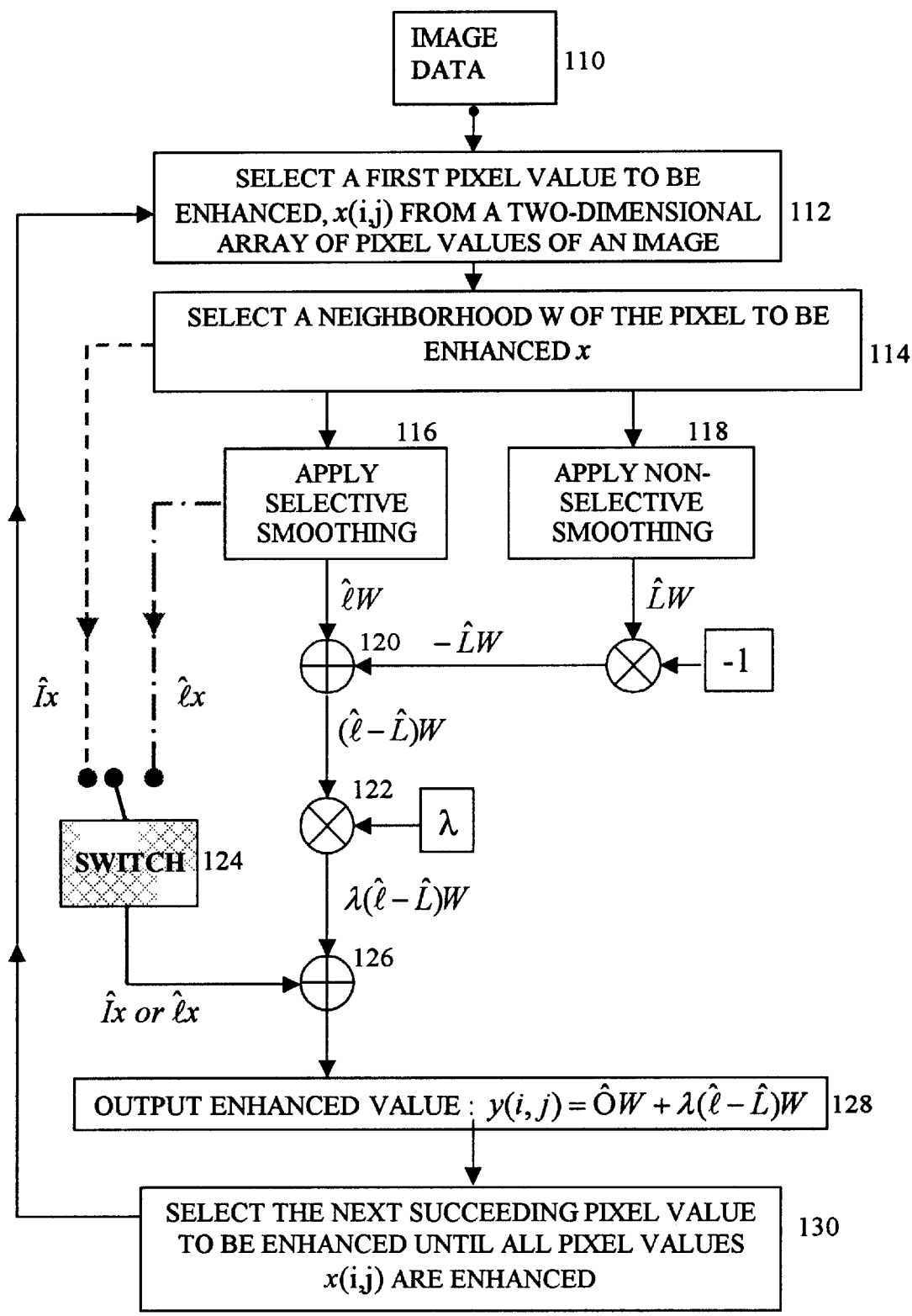
FIG. 3A illustrates a method of applying the filter as designed in FIGS. 1 and 2.
Figure 3B:
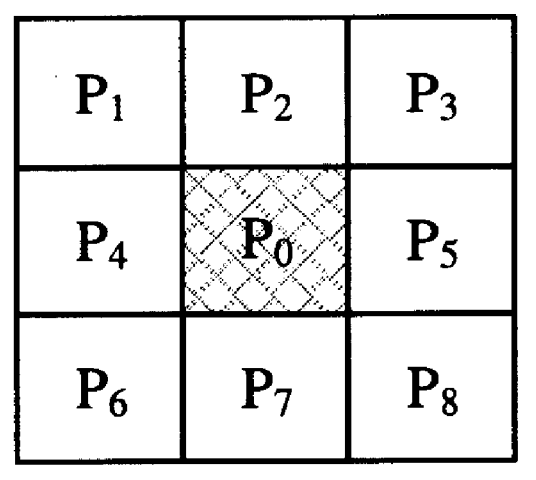

FIG. 3A shows a method of applying a filter designed according to the methods shown in FIGS. 1 and 2 of the present invention by implementing $\hat{I}$ and $\hat{L}$ separately and combining their outputs in a difference operation. Initially, a pixel value x(i,j) corresponding to a pixel of interest which is to be enhanced is selected (block 112) from the image data (block 110). Next, a neighborhood W of pixels is selected (block 114). An exemplary 3×3 neighborhood is shown in FIG. 3B which includes the pixel of interest $P_0$ and its neighboring pixels $P_1$-$P_8$. Each of the smoothing filter $\hat{I}$ and the non-selectively smoothing filter $\hat{L}$ is applied (blocks 116, 118) to the pixel value x and its corresponding selected neighborhood to generate image data $\hat{I}x$ and $\hat{L}x$ (where $\hat{I}x$ corresponds to the selectively smoothed pixel value generated by filtering pixel value x with smoothing filter $\hat{I}$ and $\hat{L}x$ corresponds to the smoothed pixel value generated by filtering pixel value x with derived matching non-selective smoothing filter $\hat{L}$).

The difference of these two pixel values is determined (120) to obtain the difference operation $(\hat{I}-\hat{L})W$ for pixel value x and its corresponding window W. The difference operation is multiplied (122) by the sharpening strength factor $\lambda$ to obtain the value $\lambda(\hat{I}-\hat{L})$ which is added (126) to either the original pixel value x or to the selectively smoothed pixel value $\hat{I}x$ dependent on whether the new filter is designed according to the method of FIG. 1 or FIG. 2.

Specifically, in the case in which the filter is designed according to FIG. 1 switch 124 is set such that the original pixel value x is added to $\lambda(\hat{I}-\hat{L})$ to obtain the enhanced output value y (128). Alternatively, in the case in which the filter is designed according to FIG. 2, switch 124 is set such that the selectively smoothed pixel value $\hat{I}x$ is added to $\lambda(\hat{I}-\hat{L})$ to obtain the enhanced value y (128).

It should be noted that although a 3×3 square-shaped neighborhood is used when performing both selective and non-selective image smoothing, the system and method of image processing according to the present invention is not limited to such a neighborhood. The neighborhood is not limited to any particular size. The number of pixels is not limited to nine. Although a fixed number of pixels in the neighborhood is preferred for all pixels of interest, the size of the neighborhood may be changed dynamically to accommodate a particular class of image region (e.g., text, graphics, natural features).

The neighborhood is not limited to any particular geometry. For example, the shape of the neighborhood may be diamond shaped. In addition, the neighborhood for each of the selective smoothing filtering operation and the selective sharpening operation need not be the same size.

As can be seen, the implementation requires (besides the computation of $\hat{I}x$ and $\hat{L}x$) just one multiplication and two subtraction/addition operations per pixel. It also has a modularity advantage, so that the implementation of either of the filters $\hat{I}$, $\hat{L}$ could be changed without affecting the final result.

According to another method of applying a filter designed using the methods shown in FIGS. 1 and 2 the two filters $\hat{L}$ and $\hat{I}$ can be applied to each pixel value with a single in-line process in which common computations in the implementations of $\hat{L}$ and $\hat{I}$ are performed by or combined into a single computation to reduce filter complexity and processing time. In addition, by incorporating both filter functions into a single in-line process, a single iteration of each pixel value is required to obtain both $\hat{I}x$ and $\hat{L}x$ instead of two separate iterations for the two filters.

In the embodiments of designing a selective sharpening filter as shown in FIG. 1 or a selective smoothing and selective sharpening filter as shown in FIG. 2, a non-selective smoothing filter $\hat{L}$ is derived from a pre-existing selective smoothing filter $\hat{I}$ by disabling the selectivity mechanism of filter 1. In another embodiment of each of the methods shown in FIGS. 1 and 2, instead of disabling the selectivity mechanism, it is set to a "weaker" selectivity state wherein a "weaker" selectivity state is defined as a state in which the selectivity mechanism of the filter causes the filter to function more like a non-selective smoothing filter than a selective smoothing filter. In other words, by decreasing the selectivity state of a selective smoothing filter, less "feature" neighborhoods are preserved and more "non-feature" neighborhoods are processed by the filter. An example of how to weaken the selectivity state of a selective smoothing filter can be shown with respect to the RAD filter. By setting the parameter T to a higher value (but not ∞) the selectivity mechanism of the RAD filter is set into a weaker selectivity state.

By deriving filter $\hat{L}$ in this manner the filter difference $(\hat{I}-\hat{L})$ essentially becomes a selective bandpass filter instead of a selective high-pass filter. This bandpass filter can then be substituted into the USM filter as described for the methods shown in FIGS. 1 and 2. The resulting filter designed in this manner provides more control over the types of neighborhoods where image sharpening is to occur.

Although in both Eqs. 3 and 4 the filter-difference $(\hat{I}-\hat{L})$ is mapped linearly by $\lambda$, it should be understood that the generalized unsharp masking method is not limited to this particular mapping. For example, $\lambda$ can have a local dependence $\lambda=\lambda(i,j)$, according to some criterion which is not incorporated through the difference $(\hat{I}-\hat{L})$. Another manner in which to generalized Eqs. 3 and 4 is by applying a general non-decreasing mapping f(t) to the result of the filter difference $(\hat{I}-\hat{L})x$ (subject to the condition f(0)=0). Namely, the filters as described in Eqs. 3 and 4 can be replaced by filters as described by:

$$y=x+f((\hat{I}-\hat{L})x) \text{ or } y=\hat{I}x+f((\hat{I}-\hat{L})x) \qquad \text{(Eq. 5)}$$

respectively. A simple example mapping f(t) is a saturated linear mapping, which ensures that the absolute sharpening signal does not pass a pre-determined threshold $\lambda T$:

$$f(t) = \begin{cases} t > T & \lambda T \\ |t| \le T & \lambda t \\ t < -T & -\lambda T \end{cases} \qquad \text{(Eq. 6)}$$

In the preceding description, numerous specific details are set forth, such as specific filters and filter implementations in order to provide a thorough understanding of the present invention. It will be apparent, however, to one skilled in the art that these specific details need not be employed to practice the present invention. In other instances, well-known digital image processing steps have not been described in detail in order to avoid unnecessarily obscuring the present invention.

In addition, although elements of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

I claim:

1. A method of designing a selective sharpening image processing filter comprising:

selecting a pre-existing selective smoothing filter having an associated selectivity mechanism;

deriving a matching non-selective smoothing filter from the pre-existing selective smoothing filter by disabling its selectivity mechanism;

in an unsharp masking filter having an associated high-pass filter operation, substituting a difference operation of the selective smoothing filter and the derived matching non-selective smoothing filter for the high-pass filter operation to form the image processing filter.

2. A method of designing a selective smoothing and selective sharpening image processing filter comprising:

selecting a pre-existing selective smoothing filter having an associated selectivity mechanism;

deriving a matching non-selective smoothing filter from the pre-existing selective smoothing filter by disabling its selectivity mechanism;

in an unsharp masking filter having an associated high-pass filter operation, substituting a difference operation of the selective smoothing filter and the derived matching non-selective smoothing filter for the high-pass filter operation, wherein the difference operation is scaled in the unsharp masking filter; and substituting selectively smoothed image pixel values for image pixel values in the unsharp masking filter, wherein the selectively smoothed image pixel values are added to the scaled difference operation in the unsharp masking filter to form the image processing filter.

3. A method of designing a selective sharpening image processing filter comprising:

selecting a pre-existing selective smoothing filter having an associated selectivity mechanism;

deriving a smoothing filter from the pre-existing selective smoothing filter by setting its selectivity mechanism to a weaker selectivity state;

in an unsharp masking filter having an associated high-pass filter operation, substituting a difference operation of the selective smoothing filter and the derived smoothing filter for the high-pass filter operation to form the image processing filter.

4. A method of designing a selective smoothing and selective sharpening image processing filter comprising:

selecting a pre-existing selective smoothing filter having an associated selectivity mechanism;

deriving a smoothing filter from the pre-existing selective smoothing filter by setting its selectivity mechanism to a weaker selectivity state;

in an unsharp masking filter having an associated high-pass filter operation, substituting a difference operation of the selective smoothing filter and the derived smoothing filter for the high-pass filter operation, wherein the difference operation is scaled in the unsharp masking filter; and substituting selectively smoothed image pixel values for image pixel values in the unsharp masking filter, wherein the selectively smoothed image pixel values are added to the scaled difference operation in the unsharp masking filter to form the image processing filter.

* * * * *